(12) United States Patent
Fridhendler et al.

(10) Patent No.: US 7,741,804 B2
(45) Date of Patent: Jun. 22, 2010

(54) MAN-POWERED SLIM CHARGER

(75) Inventors: Michael Fridhendler, Naharya (IL);
Roman Lanzet, Kiryat-Beyalik (IL);
Alexander Sromin, Ashdod (IL)

(73) Assignee: Easy Energy Inc., Karmiel (IL)

( * ) Notice: Subject to any disclaimer, the term of this patent is extended or adjusted under 35 U.S.C. 154(b) by 472 days.

(21) Appl. No.: 11/841,046

(22) Filed: Aug. 20, 2007

(65) Prior Publication Data

US 2009/0051317 A1 Feb. 26, 2009

(51) Int. Cl.
*H01M 10/46* (2006.01)
(52) U.S. Cl. ..................................... 320/101
(58) Field of Classification Search .............. 320/101, 320/107, 114, 115, 132, 149; 324/426, 433; 290/1 R, 42, 50, 53; 322/1, 2 R, 3, 99
See application file for complete search history.

(56) References Cited

U.S. PATENT DOCUMENTS

| 3,800,212 | A  | * | 3/1974  | Branco et al. ............. 290/1 E |
| 3,805,083 | A  | * | 4/1974  | Demetrescu ............... 290/1 R |
| 6,293,771 | B1 |   | 9/2001  | Haney |
| 6,664,759 | B1 |   | 12/2003 | Goris |
| 2004/0090210 | A1 | * | 5/2004 | Becker et al. ................. 322/1 |
| 2005/0057112 | A1 |   | 3/2005 | Lopatinsky |
| 2008/0074083 | A1 | * | 3/2008 | Yarger et al. ............... 320/137 |

FOREIGN PATENT DOCUMENTS

| GB | 2 427 312 | 12/2006 |
| WO | WO 2005/079524 | 9/2005 |

OTHER PUBLICATIONS

International Search Report dated Sep. 7, 2009 issued to PCT/IL2008/000908.
Written Opinion of the International Searching Authority dated Sep. 7, 2009 issued to PCT/IL2008/000908.

* cited by examiner

*Primary Examiner*—Edward Tso
(74) *Attorney, Agent, or Firm*—The Law Office of Michael E. Kondoudis

(57) ABSTRACT

A human-powered slim charger utilizing an axial flux alternator for converting a pull-out motion into an electrical current for charging and supplying battery-fed electronic devices. The charger comprises mechanical transmission means for converting a periodic linear movement into a unidirectional rotation, an axial flux alternator comprising a stator comprising a planar winding, having a plurality of coils embedded in multiple layers within said stator and circularly distributed around a central axis and two essentially identical rotors arranged to rotate together around said central axis and allocated concentrically with said winding on both sides of said stator facing each other; wherein each said rotor comprises a periodical heteropolar axially magnetized magnetic system having a definite number of poles; Finally, the device comprises a charging control module affixed to the stator, said control module configured effectively convert non-stable alternating current produced by said alternator into a charging direct current.

25 Claims, 8 Drawing Sheets

MAN-POWERED SLIM CHARGER

FIELD OF THE INVENTION

The present invention relates generally to electricity generating and charging devices, and more specifically to human powered electricity charging devices.

BACKGROUND OF THE INVENTION

The portability of many electronic devices is determined eventually by the life span of their independent power sources; usually these power sources are in the form of rechargeable battery cells. As batteries remain the weakest link in consumer electronics, batteries with longer lives, as well as more efficient ways to charge batteries are constantly being developed.

SUMMARY OF THE INVENTION

The present invention discloses an integrated device comprising three components. The first component is mechanical transmission means for converting a cycling linear movement of the input cord pulled out by a user into a unidirectional rotational motion. The second component is an axial flux alternator driven by the mechanical transmission means for producing an electrical alternating current in its stator packed on a board. The third component is a charging control module packed on said board configured to convert effectively non-stable alternating current produced by the axial field alternator into the required output DC current for charging electronic device.

In embodiments, the mechanical transmission means comprise a chain of at least two serially-connected mechanical units: a cord coiled around a revolving element (drum) which is secured to it by one end, and to be pulled by its second end; a clutch providing unidirectional transmission of applied torque on said rotors.

In embodiments, the mechanical transmission means further comprise speed multiplication means such as speed-up gear couples, speed-up chain transmission, speed-up belt transmission, and the like which are further connected mechanically in series with the drum and the clutch.

In embodiments, the mechanical transmission means comprise a unit which is connected in parallel to the drum. Said unit comprising a torsion spring (e.g. spiral spring) with one fixed end and with the second end connected to the drum.

In embodiments, the alternator comprises a stationary central plate (stator) containing a planar winding. The winding may be single-phase, with identical coils circularly distributed around a rotational axis. The alternator further comprises two identical rotors allocated concentrically with said winding on both sides of said central plate and facing each other. The number of coils corresponds to the number of poles of the rotors.

In embodiments, the planar winding is produced by any appropriate method that results in embedding the winding into the stator. These methods may include magnet wire reeling, copper stamping, copper etching, fabrication as multi-layered printed circuit board (PCB), and the like.

In embodiments, the winding is made as a multilayered printed circuit board with a plurality of coils built from planar spiral-like conductor loops in every layer, interconnected throughout the layers to form a substantially multi-layer spiral inductor.

In embodiments, the rotors are configured to rotate together around axis of said planar winding. Each of the rotors comprise a periodical heteropolar axially magnetized magnetic system with a definite pole number, made either as a plurality of permanent magnet pieces or as a single-piece multi-pole permanent magnet down. Said magnetic systems face each other and are oriented accordingly to form a common magnetic field crossing said planar winding.

In embodiments, the back plane side of each said magnetic system is in the form of a planar thin soft magnetic disk (back yoke) closing the magnetic field. Said rotors may furthermore include on their radial periphery retainers to secure said magnetic systems and for increasing inertia.

In embodiments, the charging control module is located on an extension of the stator. It is fed by alternating currents produced by said winding, and functions as a rectifier with optional voltage and current regulation, intermittent electrical energy accumulator (e.g. capacitor, battery, etc.) and state-of-charge (SOC) monitoring. The output is connected to DC consumers.

Upon operation, a user pulls out the cord of the mechanical transmission, causing the rotors to rotate around the axle, which is mutual with the winding axle. The rotation causes a sinusoidal-like change in the magnetic flux crossing each and every coil. As a result, an electrical alternating-voltage is generated in each and every coil. The coils are operatively connected to each other to achieve a required voltage level between the terminals. The alternating voltage is supplied to the electronic unit, where it is rectified, optionally stabilized and converted to direct current as required to charge rechargeable batteries, such as batteries of consumer electronics products (cellular phones, lap top computers and portable device accessories).

Simultaneously with the above described processes, the torsion spring of the mechanical transmission is engaged until the user ceases to pull the cord. Following the pulling phase completion, the cord is released; the drum is rotated back, being driven by the engaged torsion spring; thus, it recoils the cord and returns to the initial position.

At the same time, the output unit of the mechanical transmission and the rotors continue to rotate, since the clutch stops delivery of torque from the mechanical transmission and disconnects it mechanically from the alternator.

Because of the output power consumption and dissipative losses, the alternator speed decreases, and the user repeats the pulling-out phases to keep the alternator speed within desirable limits. To complete the operation, the cord is released and it returns to the initial position.

In some embodiments, to enhance the system efficiency the transmission unit comprises a speed multiplication mechanism that increases the speed of rotors rotation In some embodiments, the charger is packed as a slim-shape device for conversion of human mechanical energy into electric energy to feed an electronic (electric) device and/or to charge accumulators (batteries).

In some embodiments, the alternator fits into the back of a cellular phone and integrates into the casing thereof.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
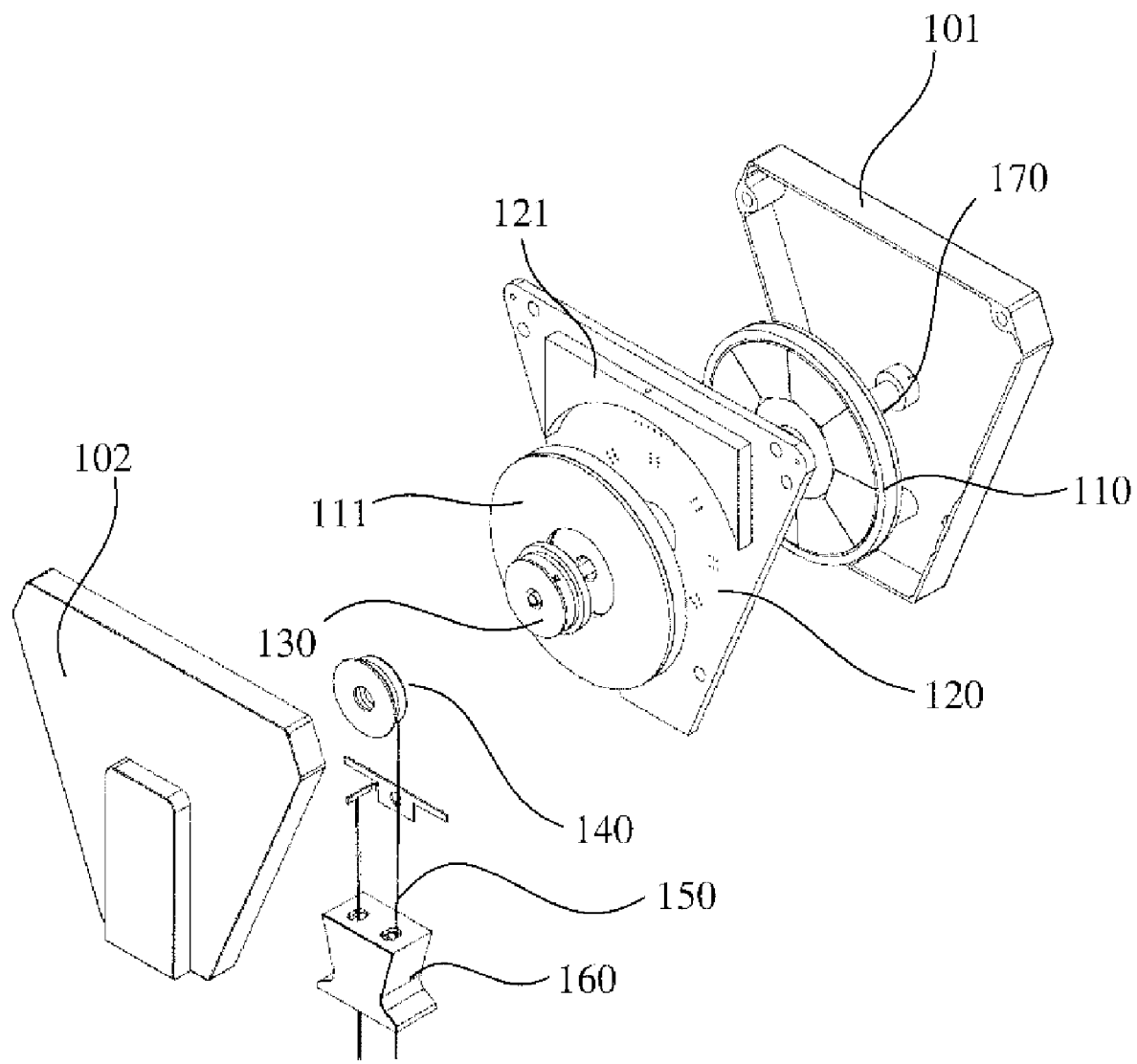
FIG. 1 is a developed view of the charger according to some embodiments of the present invention.

The drawings, together with the description, make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

FIG. 1 shows a developed view of the charger according to some embodiments of the present invention. The alternator comprises a front housing 102 and a rear housing 101, a printed circuit board (PCB) 120, a main shaft 170 and electronic unit 121 affixed to the PCB 120. A pulling cord 150 is connected to a drum 140 via a pulling applicator 160. The drum 140, which accommodates the reeled pulling cord 150, is connected to a ratchet 130. The main shaft 170 goes through the drum 140, the ratchet 130 and the first and second rotors 110, 111 as well as the PCB 120.

When the user pulls the pulling applicator 160 the drum rotates and so does the ratchet, which in turn drives the rotors 110, 111. The rotational movement of the rotors 110, 111 leads to a changing magnetic flux in each and every one of the coils (not shown) in the PCB 120. This results in alternating voltage induction that is applied to the electronic unit 121. Simultaneously with above process, the spiral spring (not shown) which is located inside of the drum 140 being fixed by one end on the shaft 170 and being connected to the drum 140 by the second end, is engaged. Upon releasing the applicator 160, the spring reverses the drum 140, recoiling the cord 150, while the ratchet mechanically disconnects the rotors 110, 111 which continue to rotate, from the reversing drum 140.

Figure 2:
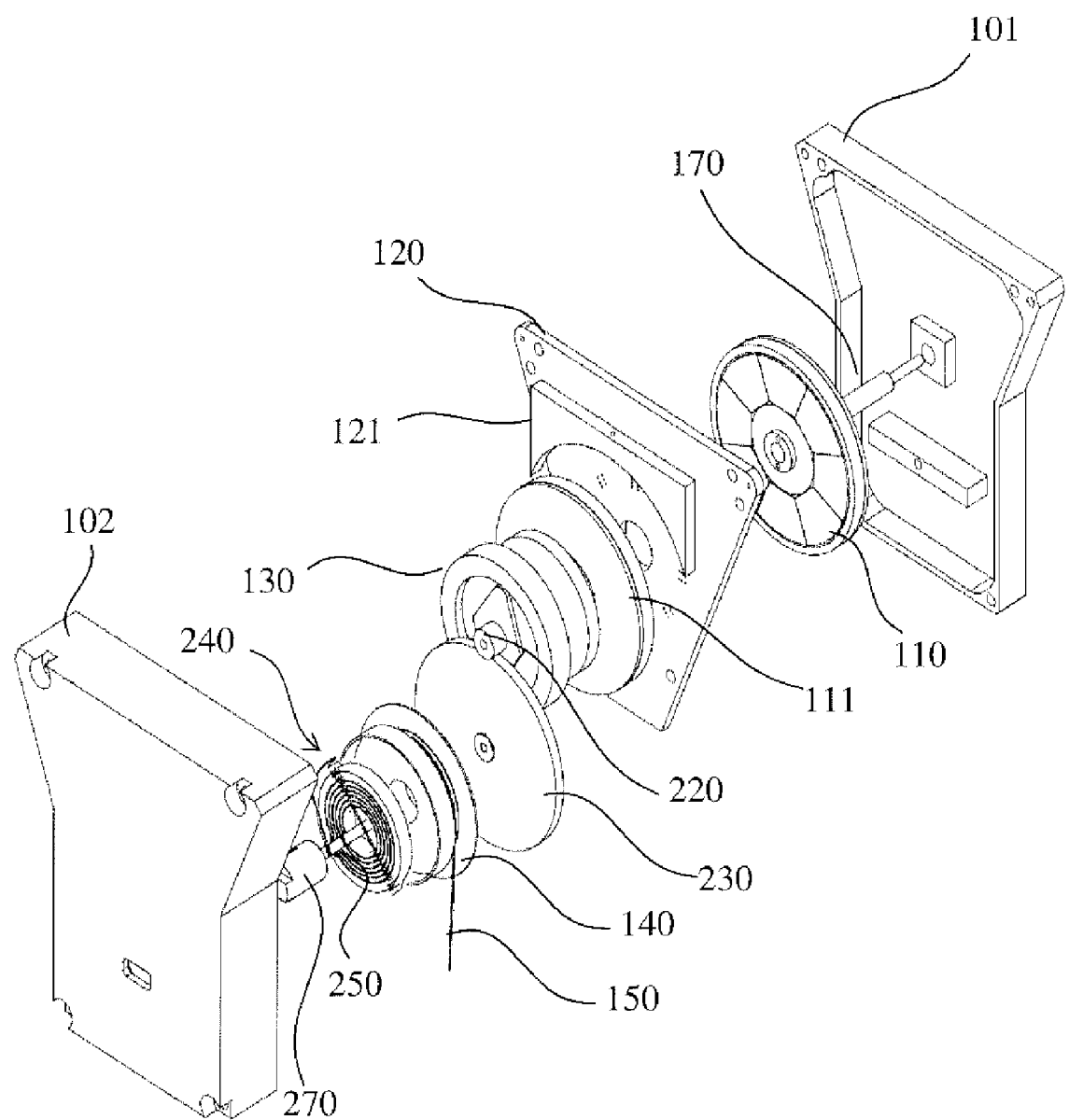
FIG. 2 is a developed view of the charger with speed multiplication by spur gear couple according to some embodiments of the present invention.

FIG. 2 is a developed view of the charger with speed multiplication by spur gear couple according to some embodiments of the present invention. According to some embodiments, the alternator is provided with a speed multiplication mechanism that further improves the efficiency of electrical current generation. The speed multiplication mechanism comprises a secondary shaft 270 on which a recoil mechanism 240 comprising a spiral spring 250 is affixed. In addition, a drum 140 is also mounted on the secondary shaft 270, with the pulling cord 150 reeled around it. Further towards the rotors 111 and 110, a large gear 230 and a small gear 220 are operatively connected, wherein the small gear is also connected to the ratchet, 130.

When the user pulls the pulling cord 150 the drum 140 rotates. The large gear 230 drives the small gear 220, thus speeding up the rotation speed of the rotors 110, 111, which leads to a lower torque requirement for the same power-hence, higher efficiency. The induced voltage is applied to the electronic unit 121.

Simultaneously with the above process, the spring 250 being fixed by one end to the secondary shaft 270 and being connected to the drum 140 by the second end, is engaged. Upon releasing the cord 150, the spring reverses the drum 140 that leads to recoiling the cord, while the clutch 130 mechanically disconnects the rotors 110, 111 which continue to rotate, from the reversing drum 140.

Figure 3:
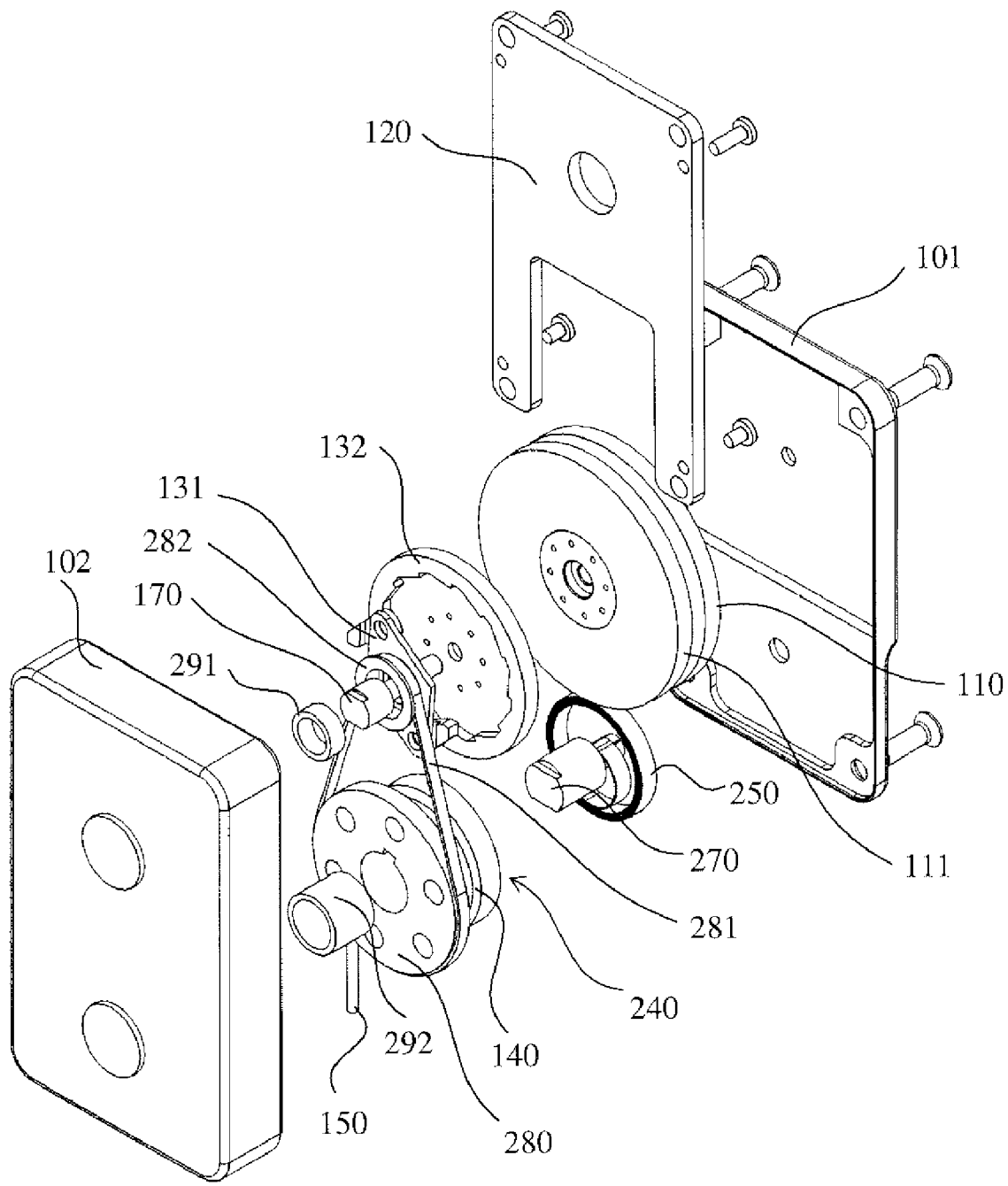
FIG. 3 is a developed view of the alternator with speed multiplication by belt transmission according to some embodiments of the present invention.

FIG. 3 is a developed view of the charger with speed multiplication means in the form of a transmission belt according to some embodiments of the present invention. According to some embodiments, the alternator is provided with a speed multiplication mechanism that further improves the efficiency of the electrical current generation. The speed multiplication mechanism comprises a large pulley 280, a small pulley 282 and a belt 281. The large pulley 280 which is concentrically integrated with a recoil mechanism 240 comprising a spiral spring 250 and the drum 140 with the pulling cord 150 reeled thereon are freely rotated around the secondary shaft 270. The small pulley 282 is mechanically connected to the driving part 131 of the clutch. The driven part 132 of the clutch is operatively connected to the rotors 111 and 110 and may be freely rotated around main shaft 170. To enhance the rotation, slide bearings 291 and 292 may be are used.

Whenever the user pulls the pulling cord 150, the drum 140 of a small diameter rotates. The large pulley 280 moves the belt 281 at multiplied linear speed in respect to the cord linear speed. The belt drives the small pulley 282, thus additionally speeding up the rotation speed of the rotors 110, 111, which leads to a lower torque requirement for the same power-hence, higher efficiency. The induced voltage is applied to the electronic unit (not shown).

Simultaneously with the aforementioned process, the spring 250 being fixed by one end to the secondary shaft 270 and being connected to the drum 140 by the second end, is engaged. Upon releasing the cord 150, the spring reverses the drum 140 that leads to recoiling the cord, while the clutch parts 131 and 132 are mechanically disconnected which in turn disconnects the rotors 110, 111 which continue to rotate, from the reversing drum 140.

Figure 4:
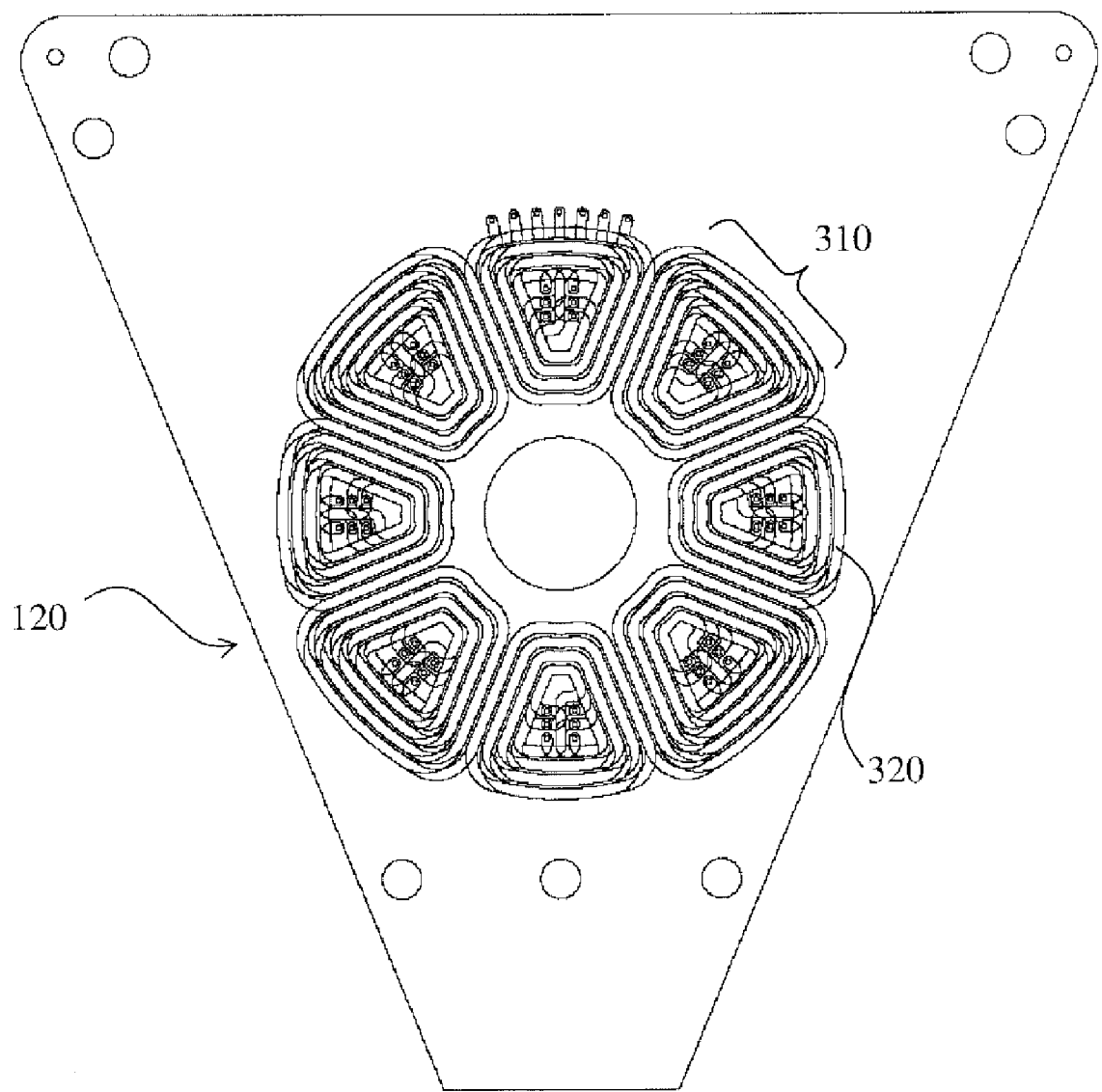
FIG. 4 is a top view of the central plate showing footprints of the coils according to some embodiments of the present invention.

FIG. 4 is a top view of the PCB 120 showing footprints of the coils according to some embodiments of the present invention. The coils 310 comprising the planar spiral loops 320 may be seen. Each loop is configured so that it may be connected to the loop in an adjacent layer of the PCB 120, creating a 3-dimensional spiral inductor. The coils may be of any shape, although clearly the trapezoid shape optimizes the surface utility.

Figure 5:
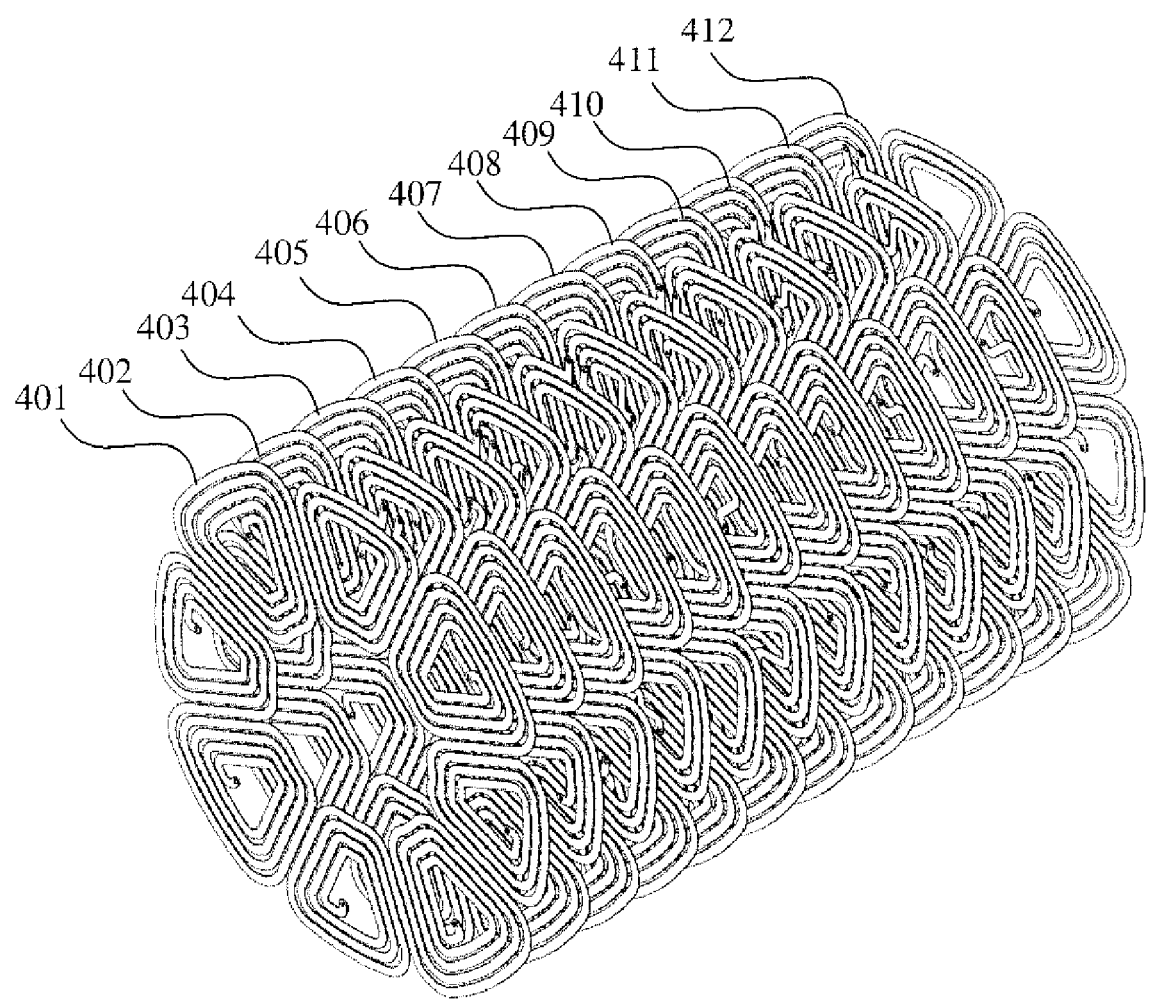
FIG. 5 is a developed view of a 12-layer coil embedded multilayer printed circuit board according to some embodiments of the present invention.

FIG. 5 is a developed view of a 12-layer coil embedded multilayer printed circuit board according to some embodiments of the present invention. As it may be apparent from the drawing, conductors of the layers of the PCB 120, from 401 to 412 are interconnected though via connectors to form a plurality of coils connected in series.

Figure 6:
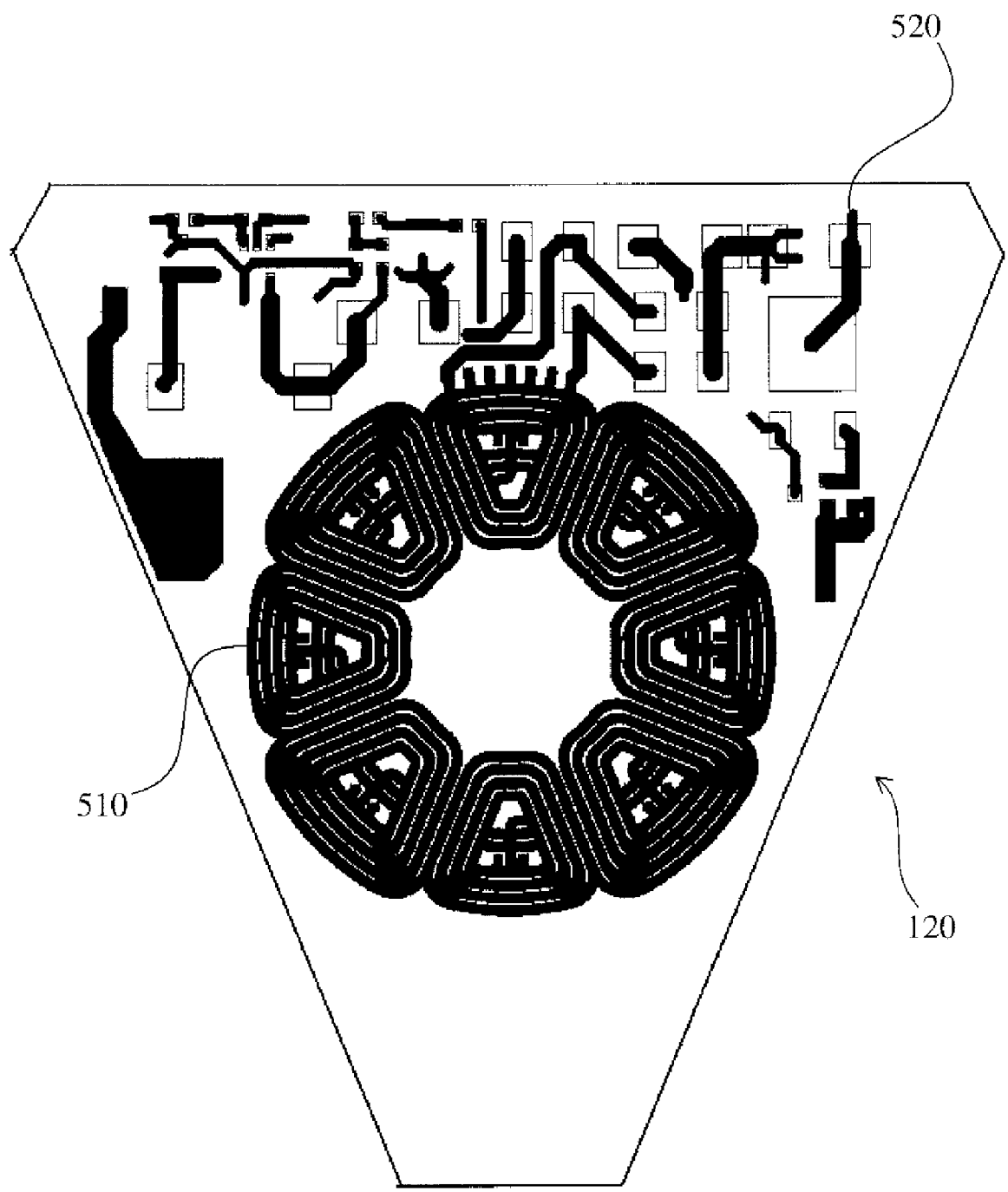
FIG. 6 is a top view of the printed circuit board central plate according to some embodiments of the present invention.

FIG. 6 is a top view of the PCB 120 according to some embodiments of the present invention 510 which shows the footprint of all coils 401-412 and the footprint of another conductor 520 incorporated into the electronic unit and packed on the same PCB 120.

Figure 7:
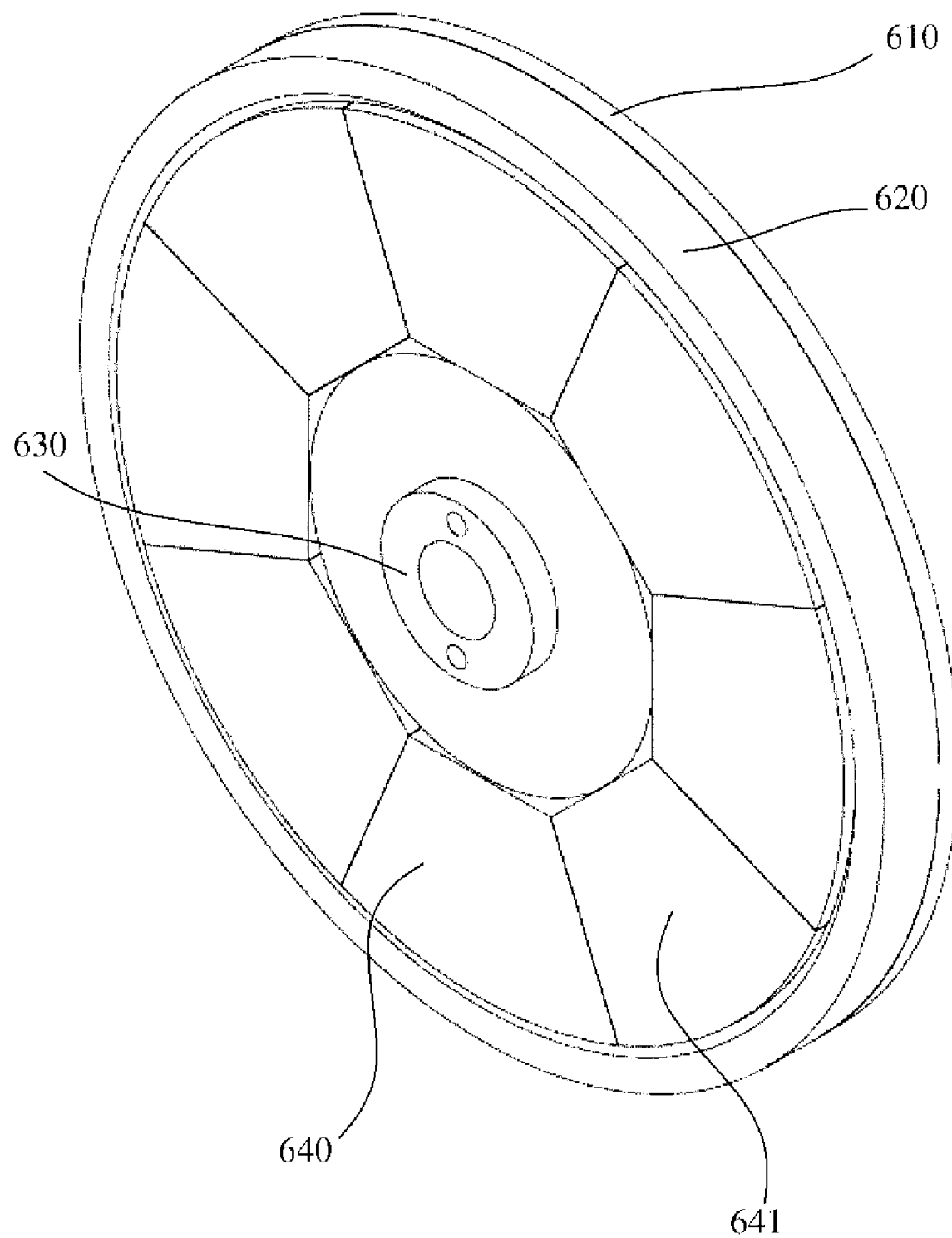
FIG. 7 is an external view of the rotating disc according to some embodiments of the present invention.

FIG. 7 is an external view of the rotor 110 (111) according to some embodiments of the present invention. The rotor 110 comprises a plurality of permanent magnets, wherein every two adjacent magnets 640, 641 have an opposite polarity. The rotor 110 further comprises a back yoke 610 on which the magnets are affixed, a shaft hub 630 by which the rotor 110 is mounted on the shaft, and a retainer 620 that keeps the magnets in place during high-speed rotations and increases the inertia.

Figure 8:
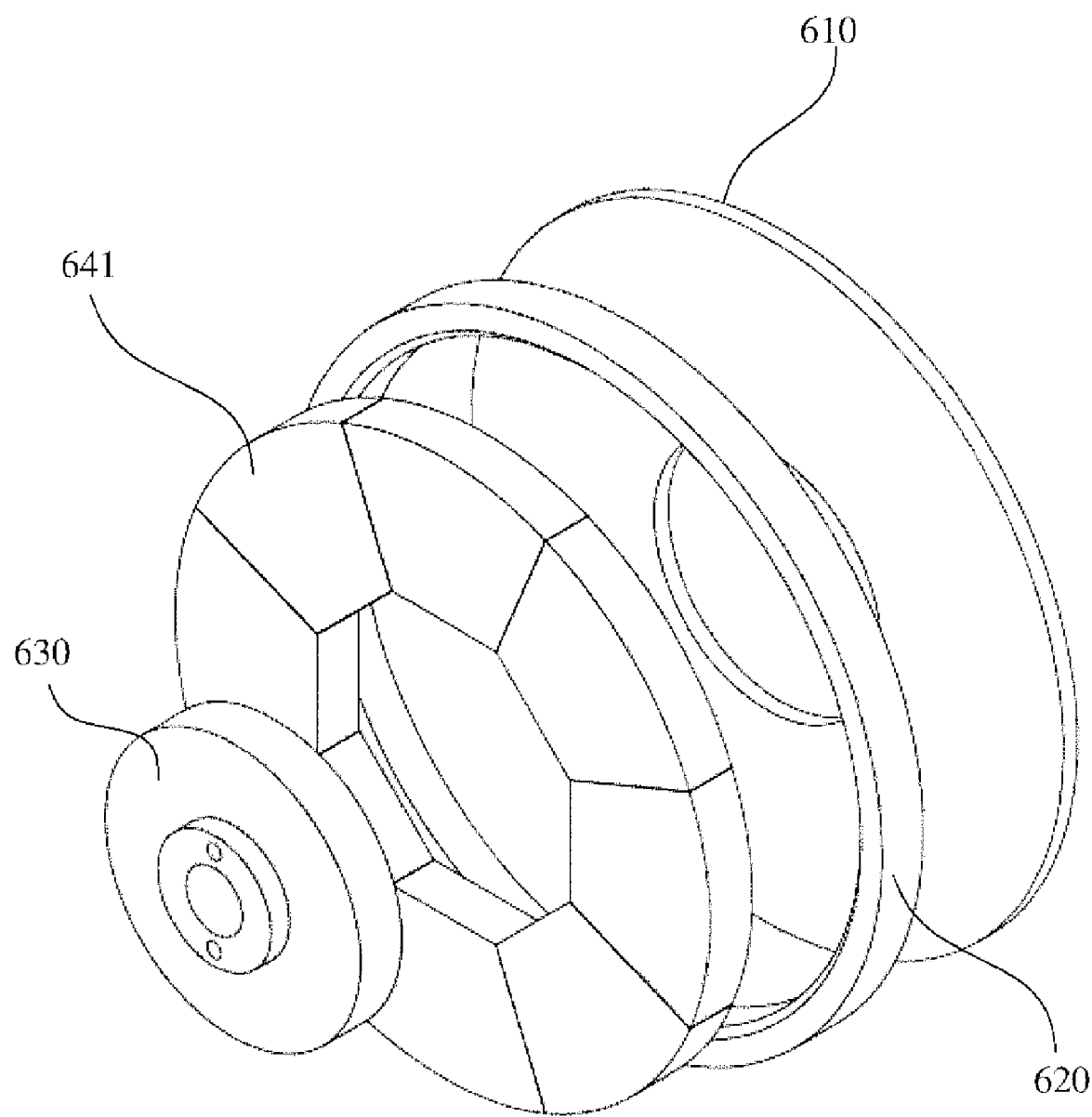
FIG. 8 is an exploded view of the rotating disc according to some embodiments of the present invention.

FIG. 8 is an exploded view of the rotor according to some embodiments of the present invention, showing how the shaft hub 630 forms the center of the rotor 110, the magnets 640, 641 positioned around it, and the retainer keeping them together and increasing the inertia.

According to some embodiments of the invention, the charger is a slim-shape device for conversion of mechanical energy of a man into electric energy to feed all electronic (electric) device and/or to charge accumulators (batteries).

According to some embodiments of the invention, the charger fits into the back of a cellular phone and integrates into the casing thereof.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box of state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A human-powered slim charger utilizing an axial flux alternator for converting a pull-out motion into an electrical current for charging and supplying battery-fed electronic devices, said charger comprising:

mechanical transmission means for converting a periodic linear movement into a unidirectional rotation;

an axial flux alternator comprising:
a central stator plate comprising a planar winding, having a plurality of coils embedded in said plate and circularly distributed around a central axis;
two essentially identical rotors arranged to rotate together around said central axis and allocated concentrically with said winding on both sides of said stator facing each other;

wherein each said rotor comprises a periodical heteropolar axially magnetized magnetic system having a definite number of poles;

and wherein said magnetic systems face each other and are oriented accordingly to form together a common magnetic field crossing said planar winding;

a charging control module affixed to said stator, said control module configured effectively convert non-stable alternating current produced by said alternator into a charging direct current.

2. The charger of claim 1, wherein said mechanical transmission means comprise:
a revolving element;
a cord reeled around said revolving element and secured thereto by one end and is further configured to be pulled out by its second end;
a torsion spring with one fixed end and with the second end connected to the drum;

a clutch providing unidirectional transmission of applied torque from said drum to said alternator.

3. The charger of claim 1, wherein each rotor comprises a planar thin soft magnetic disk affixed to the back of each rotor, closing the magnetic field is attached.

4. The charger of claim 1, wherein the charging controller further comprises a rectifier.

5. The charger of claim 1, wherein the mechanical transmission further comprises means for the speed multiplication to increase the output rotation speed.

6. The charger of claim 5, wherein said means for speed multiplication comprises at least one gear couple.

7. The charger of claim 5, wherein said means for speed multiplication comprises at least one belt couple.

8. The charger of claim 5, wherein said means for speed multiplication comprises at least one chain couple.

9. The charger of claim 1, wherein said planar winding of said alternator is implemented as a multilayered printed circuit board (PCB).

10. The charger of claim 1, wherein said planar winding of said alternator is made from coils reeled from magnet wire and secured on said central stator plate.

11. The charger of claim 1, wherein said planar winding of said alternator is made from conductors produced by copper stamping and embedded within said central stator plate.

12. The charger of claim 1, wherein said planar winding of said alternator is made from conductors produced by etching technology and embedded within said central stator plate.

13. The charger of claim 9, wherein the coils of said alternator comprise planar spiral-like conductor loops in every layer interconnected throughout the layers to form a substantially multi-layered three-dimensional spiral inductor.

14. The charger of claim 9, wherein the coils of said alternator form multi-phase windings using inter-coil connection providing a required voltage level at nominal alternator rotation speed.

15. The charger of claim 9, wherein the coils of said alternator form a single-phase winding, with the number of coils equal to the total number of poles of the rotor; inter-coil connection provides the required voltage level at nominal alternator rotation speed.

16. The charger of claim 10, wherein all the coils of said alternator are connected in series.

17. The charger of claim 1, wherein said heteropolar magnetic systems of rotors of said alternator is implemented as a plurality of permanent magnet pieces.

18. The charger of claim 1, wherein said heteropolar magnetic systems of rotors of said alternator are made as a single-piece multi-pole permanent magnet down.

19. The charger of claim 1, wherein said rotors of said alternator comprise a plurality of retainers positioned on their radial periphery for securing said magnetic systems and increasing the inertia.

20. The charger of claim 9 wherein said charging control module utilizes the same PCB for its inter-component connections.

21. The charger of claim 1, wherein said charging control module comprises an intermittent electrical energy accumulator.

22. The charger of claim 1, wherein said charging control module comprises state-of-charge (SOC) monitoring.

23. The charger of claim 1, wherein all components thereof are packed in a slim compact housing.

24. The charger of claim 1, wherein said charger is configured to fit into the back of cellular phone housing.

25. The alternator of claim 1, wherein the alternator is electrically configured to fit into a power plug of a portable device accessory.

* * * * *